(12) United States Patent
Ranson et al.

(10) Patent No.: US 12,520,775 B2
(45) Date of Patent: Jan. 13, 2026

(54) DEVICE FOR INHIBITING WEED GROWTH IN A POT

(71) Applicant: DEEWEED PTY LTD, Black Springs (AU)

(72) Inventors: Lawrence David Ranson, Black Springs (AU); Richard David Ranson, Black Springs (AU); Simon Moston, Black Springs (AU); Nicholas Ennio Ranson, Black Springs (AU)

(73) Assignee: DEEWEED PTY LTD, New South Wales (AU)

( * ) Notice: Subject to any disclaimer, the term of this patent is extended or adjusted under 35 U.S.C. 154(b) by 0 days.

(21) Appl. No.: 18/564,252

(22) PCT Filed: May 26, 2022

(86) PCT No.: PCT/AU2022/050508
§ 371 (c)(1),
(2) Date: Nov. 27, 2023

(87) PCT Pub. No.: WO2022/246514
PCT Pub. Date: Dec. 1, 2022

(65) Prior Publication Data
US 2024/0237593 A1  Jul. 18, 2024

(30) Foreign Application Priority Data
May 28, 2021 (AU) .................. 2021203499

(51) Int. Cl.
*A01G 13/31*  (2025.01)
(52) U.S. Cl.
CPC .................. *A01G 13/31* (2025.01)

(58) Field of Classification Search
CPC ..................................................... A01G 13/31
See application file for complete search history.

(56) References Cited

U.S. PATENT DOCUMENTS

| 915,897 | A | * | 3/1909 | Skorness | ............... | A01G 13/31 |
| | | | | | | D11/164 |
| 3,005,287 | A | * | 10/1961 | Dudley | ................. | A01G 13/31 |
| | | | | | | 47/32.7 |

(Continued)

FOREIGN PATENT DOCUMENTS

| CN | 101909428 A | 12/2010 |
| CN | 208675889 U | 4/2019 |

(Continued)

OTHER PUBLICATIONS

International Search Report and Written Opinion, PCT/AU2022/050508, mailed Sep. 1, 2022 (12 pages).

(Continued)

*Primary Examiner* — Jessica B Wong
(74) *Attorney, Agent, or Firm* — Bookoff McAndrews, PLLC

(57) ABSTRACT

Device for inhibiting weed growth in a pot, where the pot defines a rim around an opening. The device includes a body configured to cover at least a portion of the opening and connect about the rim. The body defines a centrally arranged aperture for receiving a plant arranged in the pot, and is shaped to form a concave upper region surrounding the aperture. The concave upper region is arranged to direct liquid received on the upper region to flow towards and through an outlet to enter the pot. At least the concave upper region is configured to be opaque such that, when arranged across the opening of the pot in use, the body inhibits light transmission through the opening.

15 Claims, 8 Drawing Sheets

(56) References Cited

U.S. PATENT DOCUMENTS

| | | | |
|---|---|---|---|
| 3,618,260 A | 11/1971 | Convey, Jr. | |
| 3,961,443 A * | 6/1976 | Insalaco | A01G 9/00 47/84 |
| 5,184,421 A * | 2/1993 | Meharg | A01G 13/22 47/65.5 |
| 5,325,627 A | 7/1994 | Anderson | |
| 5,711,106 A * | 1/1998 | Ellis | A01G 9/28 47/30 |
| 5,918,411 A | 7/1999 | Hadrava | |
| 6,976,334 B1 | 12/2005 | Bowditch | |
| 7,568,308 B2 * | 8/2009 | Stearns | A01G 13/31 47/20.1 |
| 9,462,758 B2 * | 10/2016 | Blaha | A01G 13/00 |
| 2007/0130825 A1 * | 6/2007 | Stearns | A01G 13/31 47/31.1 |
| 2008/0256855 A1 * | 10/2008 | Helmy | A01G 13/31 47/33 |
| 2014/0053461 A1 * | 2/2014 | Blaha | A01G 13/31 47/20.1 |
| 2017/0223906 A1 | 8/2017 | Castellucci et al. | |
| 2018/0007846 A1 | 1/2018 | Hoff | |
| 2019/0246574 A1 | 8/2019 | Sun | |

FOREIGN PATENT DOCUMENTS

| | | |
|---|---|---|
| GB | 2053640 A | 2/1981 |
| GB | 2313283 A | 11/1997 |
| KR | 20210007305 A1 | 1/2021 |
| WO | 9001256 A1 | 2/1990 |

OTHER PUBLICATIONS

Supplemental European Search Report dated Feb. 20, 2025, in European Application No. 22809968 (12 pages).

* cited by examiner

DEVICE FOR INHIBITING WEED GROWTH IN A POT

CROSS-REFERENCE TO RELATED APPLICATIONS

This is a National Stage Application under 35 U.S.C. § 371 of International Application No. PCT/AU2022/050508, filed May 26, 2022, which claims priority to Australian Patent Application No. 2021203499, filed on May 28, 2021, the entireties of which are incorporated herein by reference.

TECHNICAL FIELD

The present disclosure relates, generally, to weed control apparatus and, particularly, devices for inhibiting weed growth in plant pots.

BACKGROUND

Many plants are grown and/or stored in pots, such as at commercial plant nurseries, before being transferred to the ground, typically in a garden. During the period that a plant is housed in a pot, spores or seeds from other plants, commonly referred to as weeds, enter the pot by various approaches, such as being carried by the wind, allowing weeds to grow around the plant. Weeds can negatively affect growth of the plant, consuming available water and nutrients, and blocking light from reaching the plant.

To resolve this problem, weeds are typically manually removed from the pot, or killed from the application of herbicides. However, either approach often requires frequent repetition meaning that it is time consuming and expensive, particularly at large-scale commercial nurseries which can have thousands of plants in pots. This issue is exacerbated by slow-growing plant types, such as conifers, which require housing in a pot for two or more years.

Another approach to address the issue is to place a weed mat or loose mulch in the pot to surround the plant and substantially cover the soil. Weed mats are typically configured as flexible disks defining a radial slit from a centre hole or point to a periphery to allow the disk to be placed around the base of the plant. The disk is generally formed from a dense, fluid permeable fabric or material, such as coir (coconut fiber). Whilst such mats and mulch can limit weed growth, some weeds remain, often growing along the radial slit and/or around the edge of a mat, meaning that periodic manual removal of the weeds is required.

Any discussion of documents, acts, materials, devices, articles or the like which has been included in the present specification is not to be taken as an admission that any or all of these matters were common general knowledge in the field relevant to the present disclosure as it existed before the priority date of each of the appended claims.

SUMMARY

A device for inhibiting weed growth in a pot which defines a rim around an opening. The device includes a body configured to cover at least a portion of the opening and connect about the rim. The body defines a centrally arranged aperture for receiving a plant arranged in the pot, and is shaped to form a concave upper region surrounding the aperture. The concave upper region is arranged to direct liquid received on the concave upper region to flow towards and through an outlet to enter the pot. At least the concave upper region is configured to be opaque such that, when arranged across the at least a portion of the opening of the pot in use, the body inhibits light transmission through the opening.

The body may be configured to cover only a portion of the opening. The body may be configured to cover half of the opening such that, when connected to the rim adjacent a further device as described in the above paragraph, in use, the devices cover the opening of the pot.

The device may include a connector structure configured to interconnect with the body of a further device. The connector structure may include at least one tab extending away from the body and arranged so that, in use, the, or each, tab underlaps, or overlaps, the body of the further device. The, or each, tab may be arranged and shaped so that, in use, the, or each, tab extends under the concave upper region of the further device. The connector structure may be configured to releasably engage the further device.

The centrally arranged aperture may comprise the outlet, and the concave upper region be arranged to direct liquid received on the concave upper region to flow towards and through the centrally arranged aperture.

The outlet may be arranged at one side of and spaced from the centrally arranged aperture, and the concave upper region include a gutter arranged to direct liquid received on the concave upper region to flow towards and through the outlet.

The outlet may be arranged at one side of and spaced from the centrally arranged aperture to be adjacent the connector structure, and the concave upper region include a gutter arranged to direct liquid received on the concave upper region to flow towards and through the outlet so that, in use, the liquid flows over the connector structure and into the pot.

The body may define a vent recess adjacent the outlet, the recess arranged, in use, to allow ventilating inside the pot.

The device may include a domed portion extending about the centrally arranged aperture and arranged to direct liquid received on the domed portion to flow away from the centrally arranged aperture and towards the gutter.

The gutter may be shaped to form an arc extending across the concave upper region and about the centrally arranged aperture.

The body may define an outlet at each end of the gutter, and the gutter be shaped to slope downwards from a high point towards each outlet.

The body may include a peripheral region continuously joined about the concave upper region and configured to connect to the rim of the pot. The peripheral region may define a channel shaped to receive at least a portion of the rim. The channel may define a depth dimensioned to be less than a depth of the rim. At least a portion of the peripheral region may define a retention structure to allow clipping the peripheral region to the rim. The peripheral region may define one or more perforations arranged to convey air through the body to allow ventilating inside the pot.

The body may be configured to cover only a portion of the opening, and the peripheral region include a resiliently deformable tab arranged, in use, to clip to the peripheral region of another device according to any of the preceding paragraphs arranged on the rim of the pot.

The concave upper region may include one or more vent structures shaped to convey air through the body. The, or each, vent structure may include at least one hole defined in the concave upper region, and a shroud arranged to extend over the at least one hole to define a slot arranged to allow air to flow to the at least one hole from a single direction. The, or each, vent structure may be arranged to extend radially away from the aperture.

The body may be configured to entirely cover the opening and receive the rim, and define a periphery and an elongate slit extending from the central aperture to the periphery.

An assembly for inhibiting weed growth in a pot which defines a rim around an opening. The assembly includes a pair of the devices as described in the above paragraphs. Each of the devices has a body configured to cover only a portion of the opening, so that, in use, connecting the devices to the rim of the pot and adjacent each other allows covering the opening.

Each device of the assembly may have a body configured to cover half of the opening.

A first one of the devices of the assembly may be configured to have a body shaped to cover more than half of the opening, and a second one of the devices may be configured to have a body shaped to cover less than half of the opening to be complementary to the body of the first device.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

It will be appreciated embodiments may comprise steps, features and/or integers disclosed herein or indicated in the specification of this application individually or collectively, and any and all combinations of two or more of said steps or features.

BRIEF DESCRIPTION OF DRAWINGS

Embodiments will now be described by way of example only with reference to the accompany drawings in which.

DESCRIPTION OF EMBODIMENTS

Figure 1:
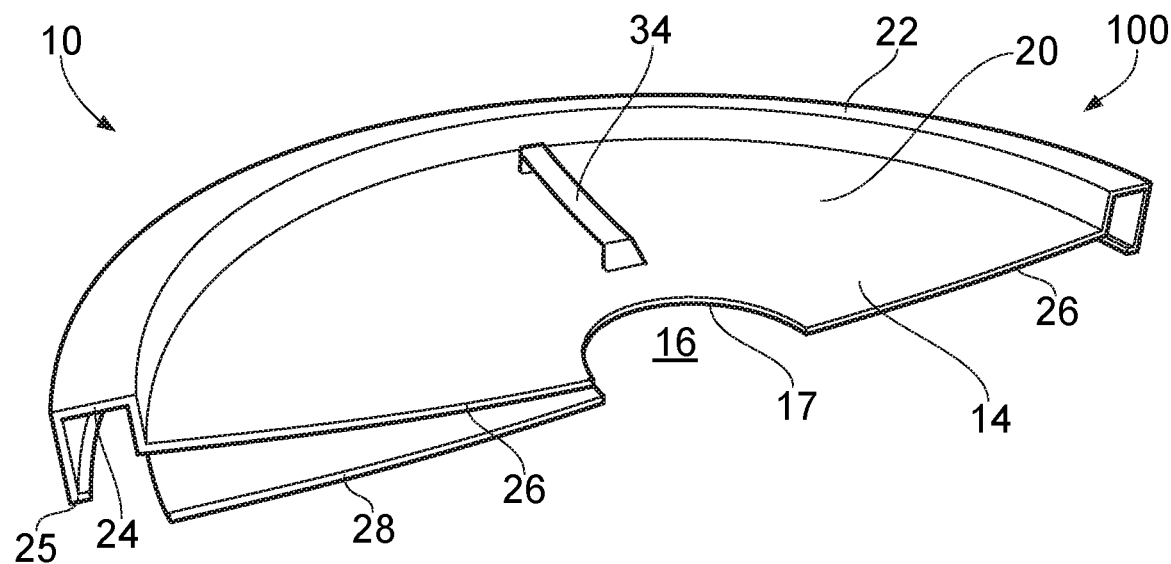
FIG. 1 is a top-perspective view of a first embodiment of a device for inhibiting weed growth in a pot.

In the drawings, reference numeral 10 generally designates a device 10 for inhibiting weed growth in a pot 12 (FIG. 4), where the pot 12 defines a rim around an opening. The device 10 includes a body 14 configured to cover at least a portion of the opening and connect about the rim. The body 14 defines a centrally arranged aperture 16 for receiving a plant 18 arranged in the pot 12, and is shaped to form a concave upper region 20 surrounding the aperture 16. The concave upper region 20 is arranged to direct liquid received on the upper region 20 to flow towards and through an outlet 17 to enter the pot 12. At least the concave upper region 20 is configured to be opaque such that, when arranged across the opening of the pot 12 in use, the body 14 inhibits light transmission through the opening.

Figure 2:
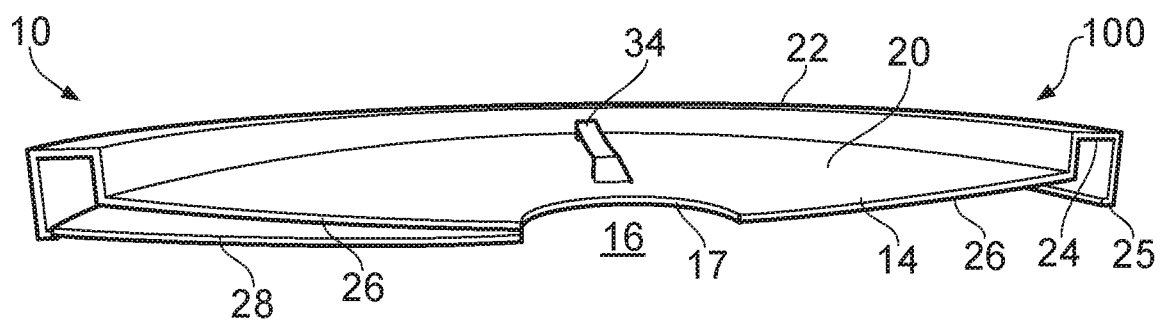
FIG. 2 is a side-perspective view of the device shown in FIG. 1.
Figure 3:
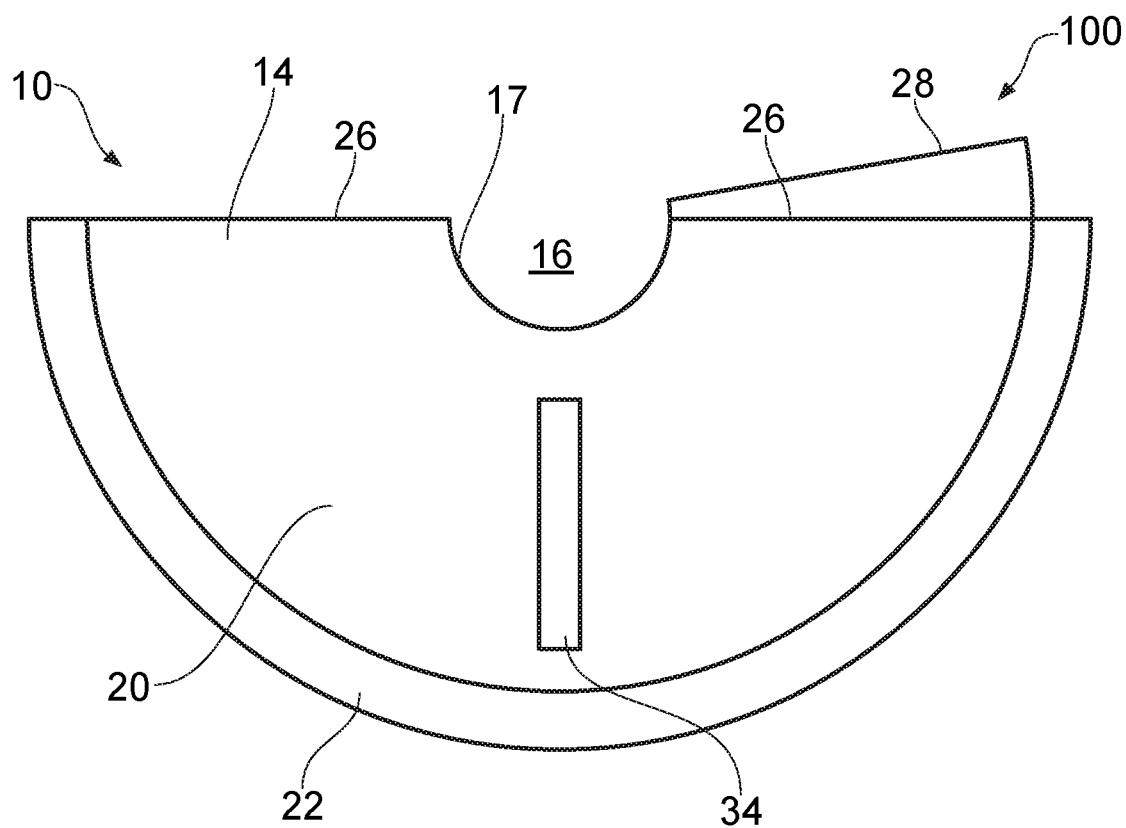
FIG. 3 is a top view of the device shown in the previous figures.
Figure 4:
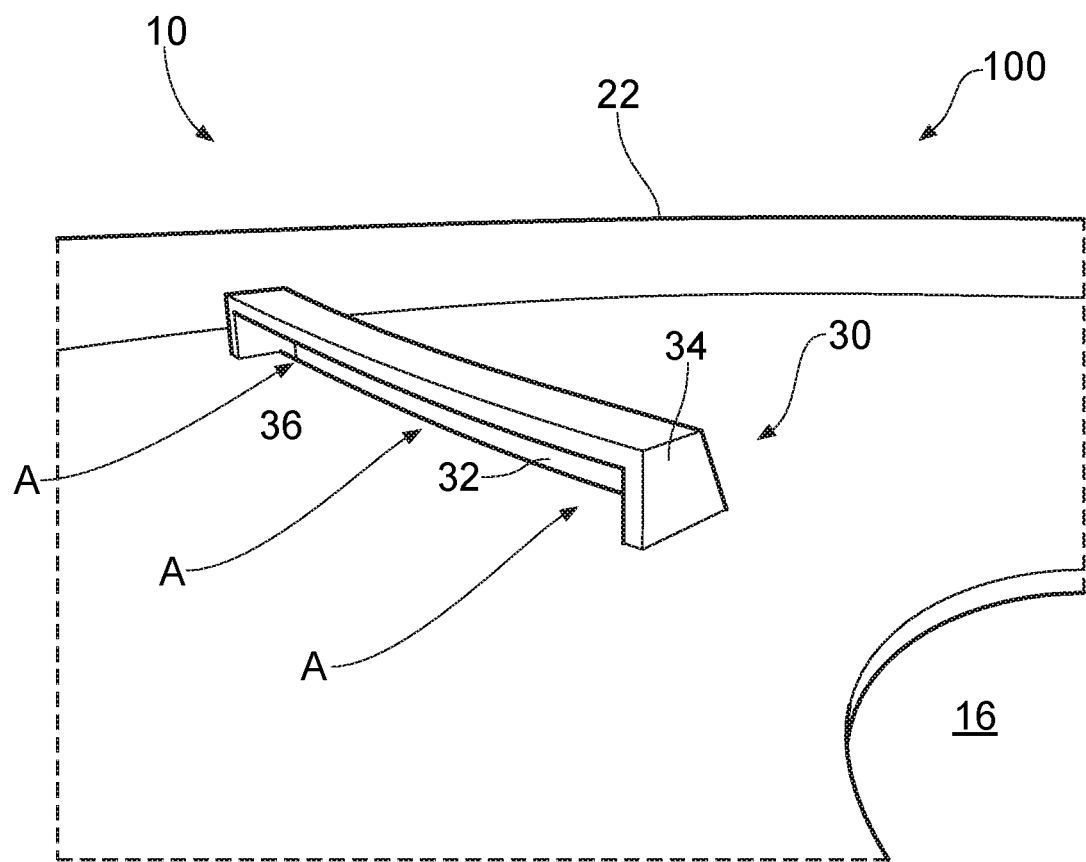
FIG. 4 is a detailed view of the device as shown in FIG. 1.
Figure 5:
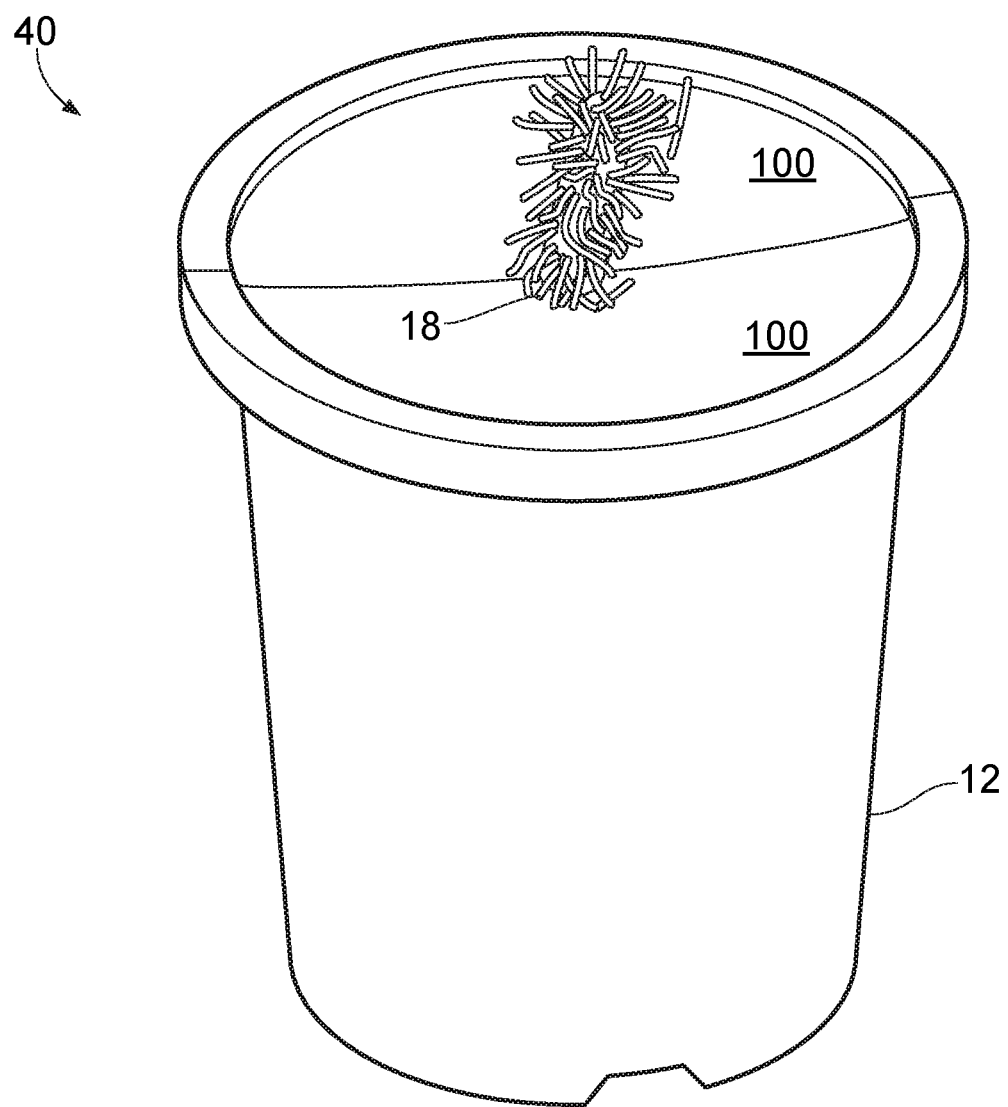
FIG. 5 is a perspective view of an assembly, including a pair of devices for inhibiting weed growth in a pot, with each device fitted to a rim of a pot to surround a plant.

FIGS. 1 to 4 show a first embodiment 100 of the device 10. FIGS. 1 to 3 show the device 100 in isolation. FIG. 4 shows a detailed view of a vent structure 30 of the device 100. FIG. 5 shows an assembly 40, including a pair of the devices 10, fitted to the pot 12 to cover the opening and surround the plant 18.

In the illustrated embodiment 100, the body 14 is shaped to cover half of a circular opening defined by the pot 12. It will be appreciated that this configuration of the body 14 is exemplary and that in other embodiments (not illustrated), the body 14 is shaped to cover a different portion of the opening, such as more or less than half. In some embodiments (FIG. 6), the body 14 is configured to entirely cover the opening. In other embodiments (not illustrated), the body 14 is configured to entirely or partially cover a different opening profile defined by the pot 12, such as a square or rectangular opening.

As shown in FIG. 5, the device 100 is configurable for use together with a like (identical) device 100 to form the assembly 40. This allows one device 100 of the pair to be connected about the rim of the pot 12 to cover half of the opening, and the other device 100 of the pair to be connected about the rim to cover the other half of the opening. In other embodiments, such as where the device 100 is configured for use with a square or rectangular opening pot (not illustrated), the device 100 may be configured for use together with a dissimilar device 100 so that one device 100 is dimensioned to cover greater or less than half of the opening, and the other device 100 is dimensioned to cover the remaining portion of the opening.

The body 14 includes a peripheral region 22 continuously joined about the concave upper region 20 and shaped to connect to the rim of the pot 12, typically the peripheral region 22 being configured to receive at least a portion of the rim. In some embodiments, the peripheral region 22 is dimensioned to securely abut against the rim to frictionally engage the rim. In other embodiments, the peripheral region 22 is configured to releasably engage the rim of the pot 12. In the illustrated embodiment and best shown in FIG. 1, the peripheral region 22 defines a continuous channel 24 dimensioned to receive part of the rim. The channel 24 is typically shaped and dimensioned to allow positioning the device 10 on the rim to inhibit the body 14 from being dislodged, such as during transit of the pot 12. This usefully also allows the device 100 to act as a lid for the pot 12, for example, to retain soil in the pot 12 should the pot 12 be knocked over, such as by wind. In some embodiments, the channel 24 defines a depth which is less than a depth of the rim. This can inhibit the device 10 being inadvertently removed from the pot 12, for example, as a result of a user picking up the pot 12 by the rim and interfering with the device 10.

In the illustrated embodiment, at least a portion of the peripheral region 22 defines a retention structure, in this embodiment being a lip 25. At least the lip 25 is resiliently deformable to allow being deformed by, and cause clipping to, the rim. In other embodiments (not illustrated), the peripheral region 22 includes a plurality of spaced, separate clip mechanisms, hooks, or other receiving or engaging structures, instead of, or in addition to, the channel 24 to allow connecting the body 14 about the rim. Generally, the peripheral region 22 is configured to be continuous about the concave upper region 20 to inhibit light transmission between the concave upper region 20 and the rim of the pot 12, which could assist weed growth around the periphery of the pot 12. Furthermore, configuring the peripheral region 22 to be continuous can advantageously enhance connection between the body 14 and the rim to inhibit the device 10 being dislodged from the pot 12 by wind, adjacent pots, or users.

In the embodiment of FIGS. 1 to 4, and best shown in FIG. 2, the concave upper region 20 is shaped to gradually slope towards the centrally arranged aperture 16 to direct liquid received on the region 20 to flow towards and through the aperture 16. In this embodiment, the aperture 16 comprises the outlet 17. The upper region 20 defines a continuous, smooth conical surface to enhance liquid flow towards the aperture 16. In some embodiments, the region 20 is polished or coated to reduce surface friction to further enhance liquid flow towards the aperture 16. In yet other embodiments (not illustrated), the upper region 20 defines ribs and valleys to control the direction of flow of collected liquid and/or enhance rigidity of the upper region 20. The configuration of the upper region 20 therefore enhances supplying water to the plant 18 arranged in the pot 12.

In the illustrated embodiment, the entire body 14 is formed from an opaque material, such as a coloured or black polymer. Typically, the material is configured to be resistant to ultra-violet (UV) light to inhibit sunlight affecting the structure of the body 14. In other embodiments (not illustrated), only the upper region 20 is formed from the opaque material, or carries ink or other pigment to colour the upper region 20. Configuring the body 14 in this way inhibits light from transmitting through the body 14 and into the pot 12, which can inhibit weed growth in the pot 12.

In some embodiments, the body 14, or at least the upper region 20, is formed from a light coloured and/or reflective material to thermally insulate the pot 12. For example, where the device 10 is specified for use in a very hot environment, the body 14 may be light grey or green coloured to reflect light and consequently reduce heat inside the pot 12. Conversely, where the device 10 is specified for use in a tropical or cool environment, the body 14 may be configured to inhibit heat from escaping from the pot 12, such as by being coloured black and/or defining a thermal insulation structure, such as defining one or more air pockets, which can assist growth of some plants and/or extend the growing season of the plant.

Best shown in FIG. 3, the body 14 defines the central aperture 16 as a semi-circle. This means that when the device 100 is arranged adjacent to a like device 100 and attached to the pot 12, the apertures 16 align to form a circular profile hole which surrounds the plant 18. It will be appreciated that the semi-circular shape is exemplary and that, in other embodiments, the central aperture 16 is alternatively shaped such as to define an oval profile. In some embodiments (not illustrated), one or more portions of fabric, such as coir matting, is arranged about the aperture 16 to cause the fabric to be deformed by the plant 18 when the device 100 is fitted to the pot 12 to further inhibit light passing the device 100 and into the pot 12. In other embodiments (not illustrated), the body 14 includes or carries a flexible portion arranged about the aperture 16, such as an over-moulded silicone flange or plate, to allow deforming against the plant 18 in use. In yet other embodiments (not illustrated), the aperture 16 includes a plurality of flexible, adjacently arranged tabs extending towards the centre of the aperture 16 to allow deforming against the plant 18 during use.

The device 100 includes a connector structure configured to interconnect with the body 14 of a like, or dissimilar, device 100 when adjacently arranged and both connected to the pot 12. In the illustrated embodiment, the connector structure includes at least one tab 28 extending away from the body 14 and arranged so that, in use, the, or each, tab 28 overlaps the body 14 of the further device 100.

Best shown in FIG. 3, the upper region 20 defines a pair of aligned rectilinear sidewalls 26 extending radially from the aperture 16. The tab 28 extends from one of the sidewalls 26 to be arranged at one side of the aperture 16. The tab 28 is shaped to overlap the body 14 of a like device 100 when arranged adjacent to each other and fitted to the pot 12. Best shown in FIG. 2, the tab 28 is spaced operatively below the concave upper region 20. This arrangement means that, in use, the tab 28 extends under the upper region 20 of an adjacently arranged device 100. The tab 28 is typically configured to abut or lie against the body 100 of the adjacent device 100. In some embodiments (not illustrated), the tab 28 includes an engaging structure shaped to interlock with a complementary engaging structure defined by an adjacently arranged device 100. This allows releasably engaging a pair of the devices 100.

Best shown in FIG. 4, in the illustrated embodiment the upper region 20 includes a vent structure 30 shaped to convey air through the body 14. The vent structure 30 includes an elongate hole 32 extending through the body 14. It will be appreciated that the hole 32 may be embodied in other forms suitable for conveying air through the body 14, such as an array of a plurality of smaller holes, and/or a mesh portion. It will be appreciated that in other embodiments the vent structure 30 may be absent.

A shroud 34 is arranged to extend across the hole 32 to enclose the hole 32 from above and on three sides such that the hole 32 is accessible from one side only. The shroud therefore defines a slot 36 arranged to allow air to flow to the hole 32 from a single direction, being substantially parallel to the upper region 20 and indicated by arrows A. The shroud 34 is configured to inhibit light passing through the hole 32. Should a weed grow from within the pot 12 and through the hole 32, the body 14 is manually rotatable relative to the pot 12 to cut the weed and/or trap the weed under the body 14, in either case typically killing the weed.

In the illustrated embodiment, the vent structure 30 is arranged to extend radially away from the central aperture 16. In other embodiments (not illustrated), the body 14 includes a plurality of vent structures 30, for example, to enhance aeration of the pot 12. Each structure 30 may be arranged radially relative to the aperture 16.

Figure 6:
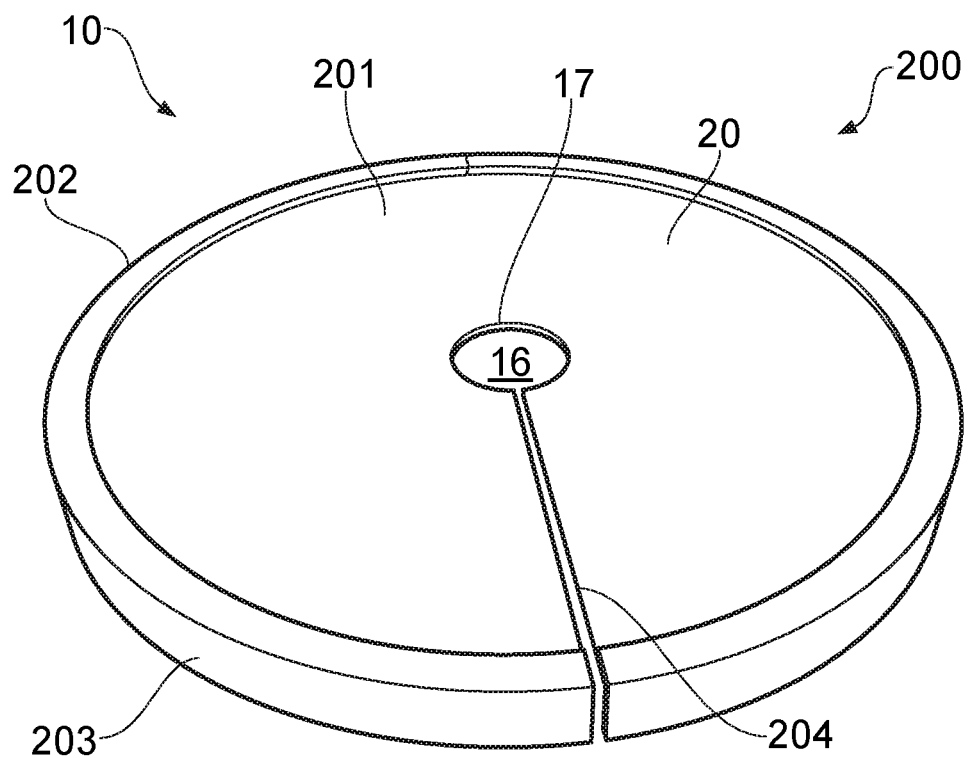
FIG. 6 is a top-perspective view of a second embodiment of a device for inhibiting weed growth in a pot.

FIG. 6 shows a second embodiment 200 of the device 10, whereby common reference numerals indicate common features. The device 200 has a body 201 shaped to substantially entirely cover a circular opening defined by the pot 12. It will be appreciated that other embodiments may be adapted to cover the opening of different pot opening profiles, such as square or rectangular. The body 200 is formed from an opaque material, such as a coloured or black polymer, or otherwise carries ink or pigment, to inhibit light transmission through the body 200 and into the pot 12.

The body 201 defines a peripheral region 202 shaped to receive the rim of the pot 12. In the illustrated embodiment, the peripheral region 202 defines a continuous annular sleeve 203 arranged to extend axially relative to the pot 12 to overlap the rim and inhibit light entering the opening. In some embodiments, the peripheral region 202 additionally or alternatively includes one or more engagement mechanisms to releasably engage the rim, such as the lip 25 structure of device 100, and/or a clip or hook mechanism.

The peripheral region 202 encircles the concave upper region 20 which surrounds and slopes towards the central aperture 16.

The body 201 defines an elongate slit 204 between the central aperture 16 and the peripheral region 201, and is at least partially formed from a resiliently deformable material. This configuration allows the body 201 to be manually flexed to widen the slit 204 and arrange the body 201 about the plant 18 such that the plant 18 is positioned within the aperture 16.

Figure 7:
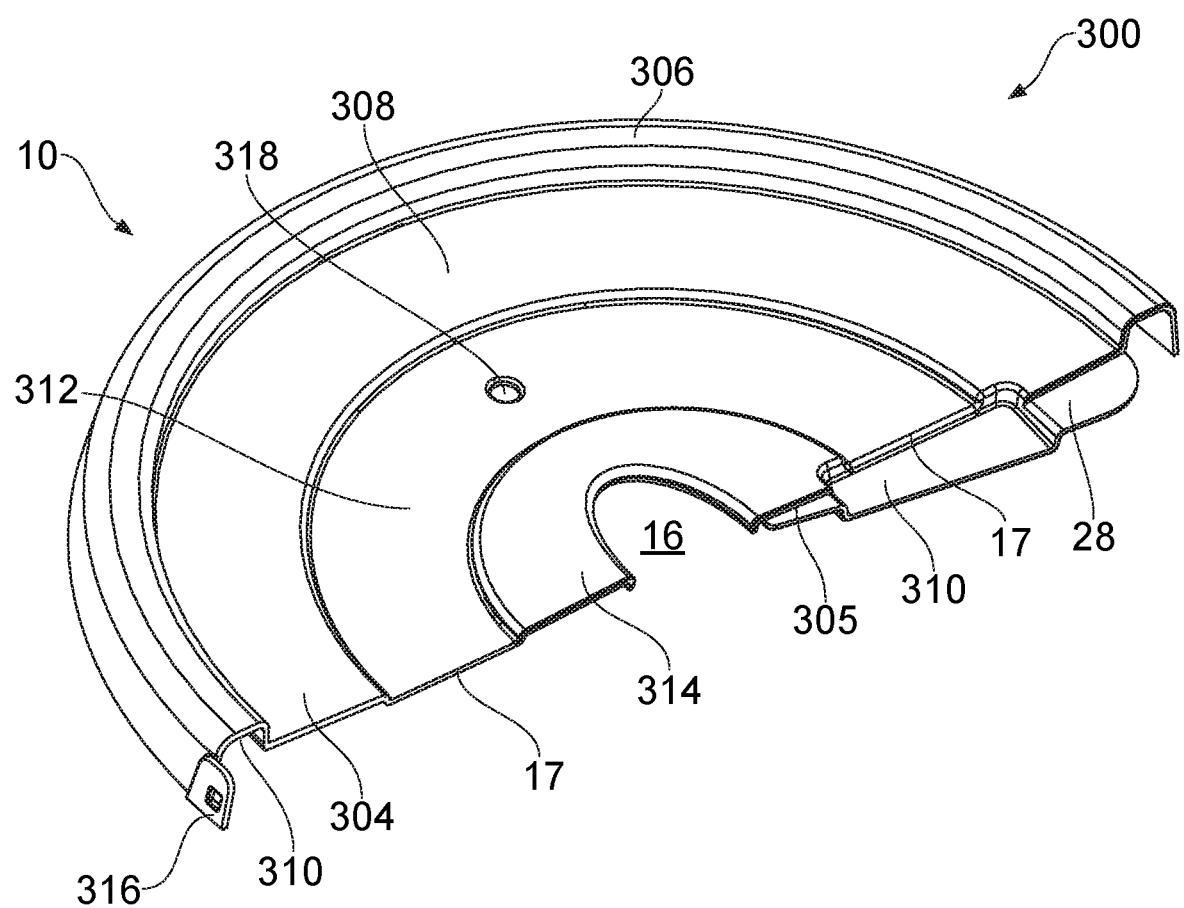
FIG. 7 is a top-perspective view of a second embodiment of a device for inhibiting weed growth in a pot.
Figure 8:
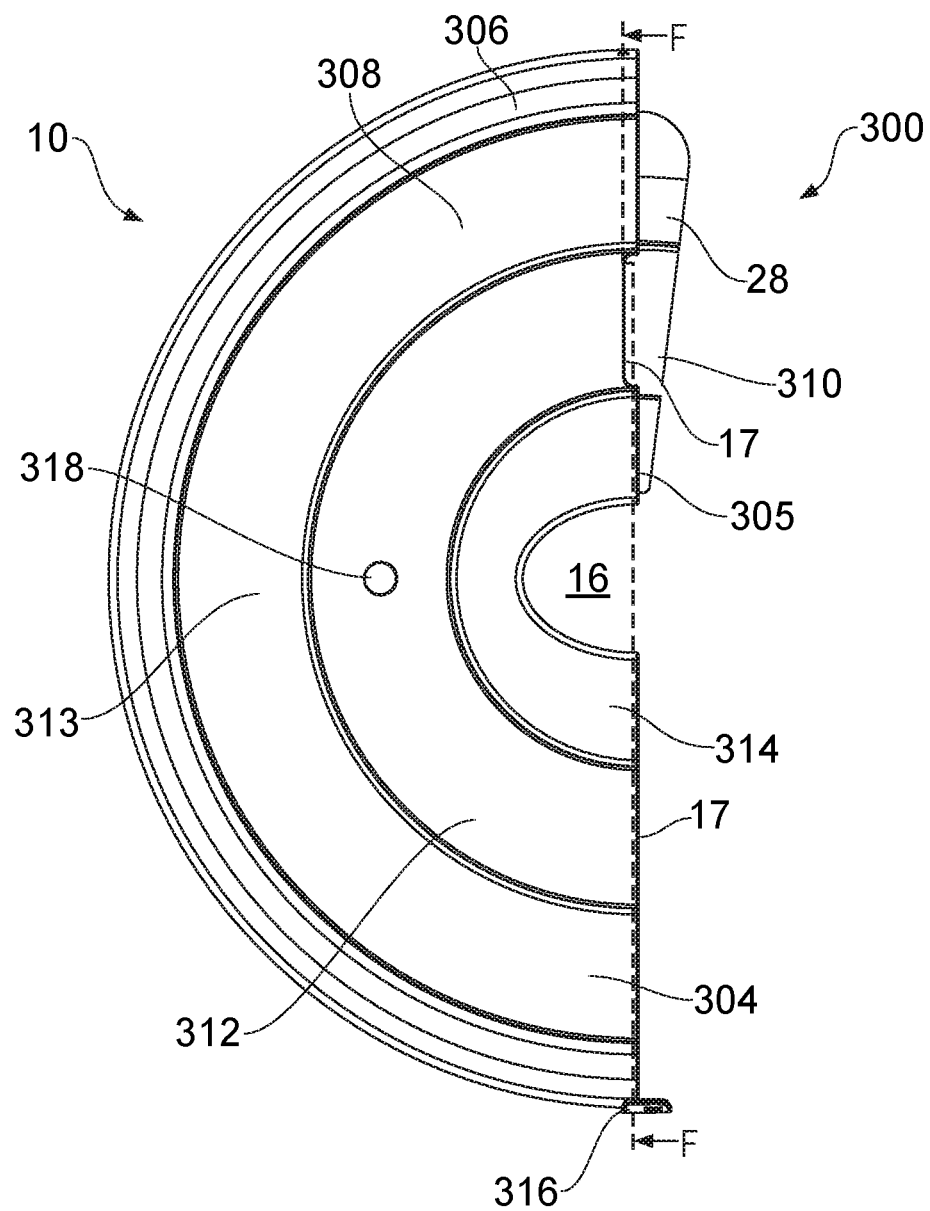
FIG. 8 is a top view of the device shown in FIG. 7.
Figure 9:
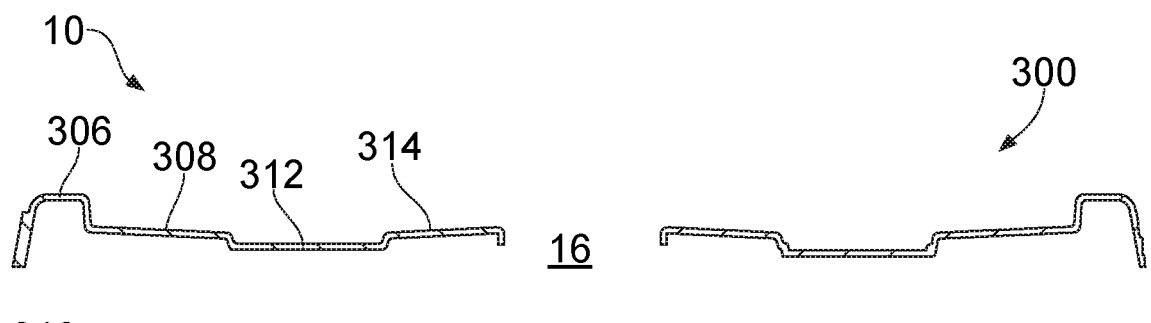
FIG. 9 is a side cross-sectional view of the device shown in FIGS. 7 and 8 taken along line F-F of FIG. 8.
Figure 10:
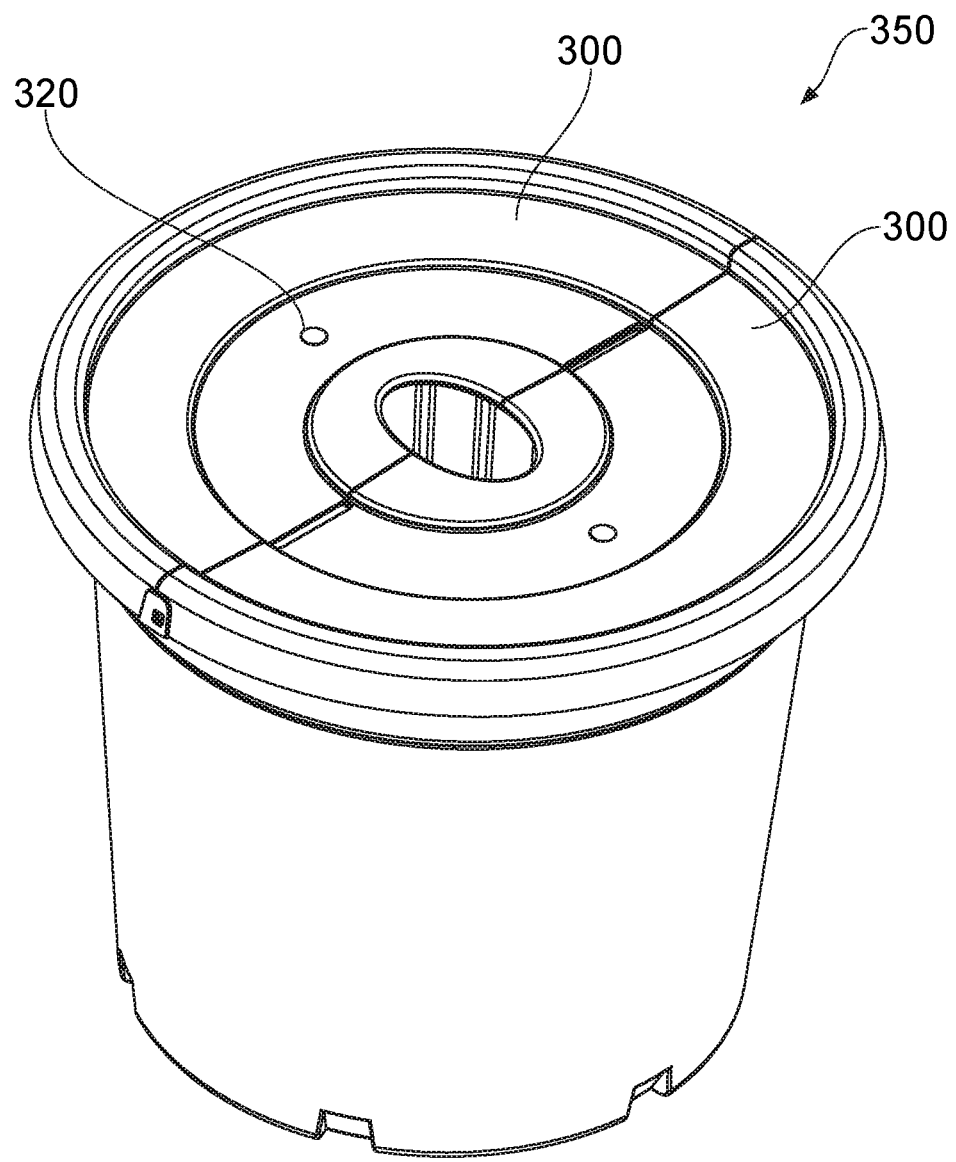
FIG. 10 is a perspective view of an assembly, including a pair of the devices shown in the FIGS. 7 to 9, fitted to a rim of a pot.

FIGS. 7 to 10 show a third embodiment 300 of the device 10 which shares features with the previously described embodiments. It will be appreciated that common reference numerals indicate common features unless described otherwise. FIGS. 7 to 9 show the device 300 in isolation. FIG. 10 shows an assembly 350, including a pair of the devices 300, fitted to the pot 12 to cover the opening.

In the illustrated embodiment 300, the body 304 is shaped to cover half of a circular opening defined by the pot 12. It will be appreciated that this configuration of the body 304 is exemplary and that in other embodiments (not illustrated), the body 304 is shaped to cover a different portion of the opening, or a differently shaped opening profile, such as a square or rectangular profile.

As shown in FIG. 10, the device 300 is configurable for use together with a like (identical) device 300 to form the assembly 350. This allows one device 300 of the pair to be connected about the rim of the pot 12 to cover half of the opening, and the other device 300 of the pair to be connected about the rim to cover the other half of the opening.

The body 304 includes a peripheral region 306 continuously joined about a concave upper region 308, the peripheral region 306 shaped to connect to the rim of the pot 12. Best shown in FIG. 9, the peripheral region 306 defines a channel 310 for receiving at least a portion of the rim. In this embodiment, the channel 310 is slightly flared and dimensioned to have a depth which is less than a depth of the rim to avoid objects abutting the rim, such as other pots or a user, inadvertently displacing the device 300 from the pot 12.

The concave upper region 308 is recessed operatively below the peripheral region 306 such that the peripheral region 306 defines a raised boundary about the concave region 308. The concave upper region 308 in this embodiment includes a gutter 312 arranged about the centrally arranged aperture 16. The upper region 308 is shaped to gradually slope operatively downwards and away from the peripheral region 306 towards the gutter 312. The gutter 312 is shaped to cause liquid received in the gutter 312 to flow towards and through one of a pair of outlets 17 and into the pot 12. In this embodiment, an outlet 17 is located at each end of the gutter 312, such that each outlet 17 is spaced from the centrally arranged aperture 16 and along a side 305 of the body 304.

The gutter 312 defines an arc about the central aperture 16, the arc sloping continuously downwards from a high point located along a radially extending centre line 313 (FIG. 8) towards both outlets 17 to cause liquid to flow to either outlet 17 and into the pot 12. It will be appreciated that the body 304 may define more, or less, outlets 17, to adjust liquid distribution across media within the pot. Similarly, the, or each, outlet 17 may be alternatively located, such as within the concave upper region 308 or the gutter 312, and the gutter 312 be alternatively shaped to slope towards the outlet(s) 17 to encourage drainage through the outlet(s) 17. For example, in some embodiments (not illustrated), the outlet 17 is configured as a single aperture defined along the centre line 313 and spaced substantially equidistantly between from the central aperture 16 and the peripheral region 308, and the gutter 312 is shaped to define a pair of opposed sloped surfaces which traverse from the side 305 of the body 304 towards the outlet 17. In yet other embodiments, only one end of the gutter 312 is configured as the outlet 17, and the gutter is arranged to continuously slope towards the outlet 17 end.

The device 300 includes a connector structure, configured as the tab 28, extending from and along the side 305 of the body 304. The tab 28 is configured to allow connecting to another device 300 when arranged on the pot 12.

The tab 28 defines a vent recess 310 arranged to enhance air flow from outside of the device 300 over the tab 28 and into the pot 12, and vice versa, when the device 300 is connected to another device 300 in the assembly (FIG. 10). One of the outlets 17 in this embodiment is formed by the vent recess 310 to be adjacent the connector structure, being the tab 28. The gutter 312 is arranged to direct liquid and any particles carried by the liquid, such as airborne weed seeds and/or fertilizer, received on the concave upper region 308 to flow towards and through the outlet 17 so that, in use, the liquid flows over the tab 28 and into the pot 12. This arrangement causes water to enter the pot 12 at a location spaced from the central aperture 16 to distribute water into the pot 12 away from light which may reach media, such as soil, through the central aperture 16. This can advantageously inhibit weed growth immediately adjacent the aperture 16 and/or enhance plant growth by improving water distribution across its root structure.

The vent recess 310 is arranged to recess part of the tab 28 to enhance clearance between the tab 28 and the body 304 of another like device 300 when arranged in the assembly 350 on the rim of the pot 12. In some embodiments, such as shown in FIG. 7, the vent recess 310 defines a width which is greater than the width of the gutter 312. This arrangement can enhance receiving the portion of the gutter 312 protruding from an adjacent device 300 fitted to the pot 12 in the assembly 350, which can enhance forming a secure connection between devices 300, and further enlarges the envelope for water to be distributed across media inside the pot 12, and for gas to flow between outside and inside of the pot 12. In other embodiments, such as shown in FIG. 8, the vent recess defines a width which is the same or less than the width of the gutter 312.

The vent recess 310 is arranged to collect weed seeds which may fall onto the body 304 and be guided by wind and gravity, or washed by liquid, over the concave upper region 308 into the gutter 312 and to the outlet 17. This arrangement can helpfully retain the weed seeds in the vent recess 310, or deposit the weed seeds into the pot 12, away from any light entering the pot 12 through the central aperture 16 which could cause germination of the seeds.

The centrally arranged aperture 16 is surrounded by a domed portion 314 of the body 304. The domed portion 314 is shaped to cause liquid received on the domed portion 314 to flow away from the central aperture 16 and into the gutter 312. Best shown in FIG. 9, the domed portion 314 includes substantially flat, sloped surfaces and step which descends into the gutter 312. In other embodiments (not illustrated), the domed portion defines curved surfaces arranged to cause liquid to flow into the gutter 312. The domed portion 314 can inhibit water entering into the pot 12 through the central aperture 16 and consequently inhibit weeds growing from inside the pot 12 and through the aperture 16.

Best shown in FIG. 7, the peripheral region 306 includes a resiliently deformable tab 316. The tab 316 is arranged so that, in use, the tab 316 can clip to the peripheral region 306 of another device 300 arranged on the rim of the pot 12, such as illustrated in FIG. 10. Typically, a protrusion (not shown) is arranged at an opposed side of the peripheral region 306, the protrusion shaped to be at least partially received by the tab 316 to enhance retaining the pair of devices 300 together on the rim of the pot 12.

In some embodiments, such as illustrated in FIG. 7, the body 304 defines a watering aperture 318 dimensioned to receive a dripper or sprinkler. In some embodiments, such as illustrated in FIG. 10, the watering aperture 318 is covered by an insert 320 joined to the body 304 by a frangible seam, the insert arranged to be manually pressed out of the body 304 to reveal the aperture 318.

FIG. 10 shows a pair of the devices 300 connected together and about the rim of the pot 12 to cover the opening. The central apertures 16 defined by each body 304 are aligned to form a continuous, elliptical opening for the plant to grow through. The elliptical shape of the aperture 16 also allows accommodating a stake secured to the plant. The outlets 17 are arranged at opposed sides of the central aperture 16 to define two locations through which liquid is directed into the pot 12 by the gutters 312.

Use of the device 100, 200, 300 involves connecting the device 100, 200, 300 about the rim of the pot 12 such that the plant 18 is arranged to extend through the aperture 16. The device 100, 300 is typically arranged adjacent to another device 100, 300 connected to the rim to allow covering the opening of the pot 18, and most typically arranged adjacent to a like device 100, 300 to form the assembly 40, 350.

The device 100, 200, 300 and assembly 40 allow substantially enclosing the opening of the pot 12 with an opaque, continuous covering configured to allow the plant 18 to extend out of the pot 12. This arrangement substantially inhibits light penetrating into the pot 12 and, as a result, can inhibit weeds growing in the pot 12. The device 100, 200, 300 and assembly 40, 350 are further configured to collect and direct water through the outlet 17, such as through the centrally arranged aperture 16, and/or through a join between devices 300, and to the plant 18 which can enhance growth of the plant. Where the device 300 is configured to direct fluid flow through the outlets 17 spaced from the central aperture 16, this can wash weed seeds through the outlets 17 to inhibit weed growth adjacent to the plant.

The device 100, 300 is configured to cover only a portion of the opening of the pot 12 and be arranged adjacent a further device 100, 300 to cover the opening. This arrangement enhances convenience of fitting the device 100, 300 about the plant 18 to cover the opening.

The device 100, 200, 300 and assembly 40, 350 are typically configured to receive the rim of the pot 12 to securely mount the device 100, 200, 300 and assembly 40, 350 about the rim. This means that the device 100, 200, 300 and assembly 40, 350 can provide a lid to retain the plant 18 and associated soil or other media in the pot 12. This may prevent accidental removal of the plant 18 and/or soil from the pot 12, such as due to being knocked over during transit or by wind.

The concave upper region 20 of the device 10 is shaped to collect liquid and cause the liquid to flow towards and through the outlet 17, such as through the central aperture of device 100, or over the connector structure of the device 300, to enter inside of the pot 12. As a result, the liquid drips onto the soil at one or two locations directly above the root system of the plant. This limits water delivery across the topsoil contained in the pot to be at the defined location(s) which can inhibit weed germination and growth. Where the outlet(s) 17 are spaced from the plant 18, this distributes water away from the stem of the plant 18 which can reduce instances of fungal rot.

The concave upper region 20 of the device 10 may be shaped to inhibit evaporation of moisture from soil contained in the pot 12 and return evaporating moisture to the soil, as evaporated vapour is collected on the underside of the region 20 and caused to flow operatively downwards to drip back into the soil. This can consequently limit irrigation requirements for the plant. Preliminary experiments indicate that around 20% less water is required to irrigate a plant grown in a pot 12 covered with the device 10, when compared to a control plant grown in an uncovered pot.

Limiting weed growth in pots is often attempted by applying herbicide to the plant or media in the pot. Use of the device 10 can significantly reduce the volume of herbicide consumed during a pot growth period. Preliminary experiments have shown the volume of herbicide used to grow a single plant can be decreased by around 90%.

Installing the device 10 to a pot 12 can provide a cover across media in the pot 12. This arrangement can inhibit transfer of media between pots, consequently reducing transfer of fungal plant pathogens between pots.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A device for inhibiting weed growth in a pot, the pot defining a rim around an opening, the device including:
a body configured to cover half of the opening and connect about the rim of the pot, the body defining a side arranged, in use, to extend across the opening of the pot,
the body defining a centrally arranged aperture for receiving a plant arranged in the pot, and an outlet for allowing liquid to flow into the pot, the outlet being spaced from the aperture and along the side of the body,
the body shaped to form a concave upper region surrounding the aperture, the concave upper region defining a gutter extending about the aperture and shaped to direct liquid received on the concave upper region to flow towards and through the outlet to enter the pot, the aperture being surrounded by a domed portion of the body shaped to cause liquid received on the domed portion to flow away from the aperture and into the gutter,
the body configured to be opaque to inhibit light transmission through the body, and
a connector structure configured to interconnect with a further, identical device to cover the opening of the pot when arranged on the pot adjacent the further device, the connector structure including a tab extending away from the side of the body and arranged to be aligned with the outlet so that, in use, the tab underlaps the body of the further device to connect to the further device, and covers under the outlet to inhibit light transmission through the outlet, the tab shaped to allow liquid to flow from the outlet over the tab and into the pot.

2. The device according to claim 1, wherein the tab is arranged and shaped so that, in use, the tab extends under the concave upper region of the further device.

3. The device according to claim 1, wherein the connector structure is configured to releasably engage the further device.

4. The device according to claim 1, wherein the body defines a vent recess adjacent the outlet, the recess arranged, in use, to allow ventilating inside the pot.

5. The device according to claim 1, wherein the body includes a peripheral region continuously joined about the concave upper region and configured to connect to the rim of the pot.

6. The device according to claim 5, wherein the peripheral region defines a channel shaped to receive the rim.

7. The device according to claim 6, wherein the channel defines a depth dimensioned to be less than a depth of the rim.

8. The device according to claim 5, wherein at least a portion of the peripheral region defines a retention structure to allow clipping the peripheral region to the rim.

9. The device according to claim 5, wherein the peripheral region includes a resiliently deformable clip arranged, in use, to clip to the peripheral region of the further device.

10. The device according to claim 1, wherein the concave upper region includes one or more vent structures shaped to convey air through the body.

11. An assembly for inhibiting weed growth in a pot, the pot defining a rim around an opening, the assembly including a pair of devices, wherein each device includes:
- a body configured to cover half of the opening and connect about the rim of the pot, the body defining a side arranged, in use, to extend across the opening of the pot,
- the body defining a centrally arranged aperture for receiving a plant arranged in the pot, and an outlet for allowing liquid to flow into the pot, the outlet being spaced from the aperture and along the side of the body,
- the body shaped to form a concave upper region surrounding the aperture, the concave upper region defining a gutter extending about the aperture and shaped to direct liquid received on the concave upper region to flow towards and through the outlet to enter the pot, the aperture being surrounded by a domed portion of the body shaped to cause liquid received on the domed portion to flow away from the aperture and into the gutter,
- the body configured to be opaque to inhibit light transmission through the body, and
- a connector structure configured to interconnect with the other device of the pair of devices to cover the opening of the pot when arranged on the pot adjacent the other device, the connector structure including a tab extending away from the side of the body and arranged to be aligned with the outlet so that, in use, the tab underlaps the body of the other device to connect to the other device, and covers under the outlet to inhibit light transmission through the outlet, the tab shaped to allow liquid to flow from the outlet over the tab and into the pot.

12. The device according to claim 1, wherein the body defines a pair of the outlets spaced apart from each other along the side of the body, and the gutter is shaped to slope downwards from a high point towards each of the outlets.

13. The device according to claim 12, wherein the gutter defines opposed ends and a width, and wherein each outlet is arranged at one end of the gutter to extend across the width of the gutter to receive the liquid flowing in the gutter.

14. The device according to claim 4, wherein the vent recess is at least partially defined by the tab.

15. The device according to claim 14, wherein the vent recess is arranged to be aligned with the gutter and define a width which is greater than a width of the gutter.

* * * * *